United States Patent [19]
Dashevsky et al.

[11] Patent Number: 5,346,970
[45] Date of Patent: Sep. 13, 1994

[54] BLEND OF POLYETHYLENE TEREPHTHALATE MATRIX AND THERMOTROPIC LIQUID CRYSTAL BLOCK COPOLYMER

[75] Inventors: Sophia Dashevsky, Fair Lawn, N.J.; Ki-Soo Kim, Katonah; Stanley W. Palmaka, Yonkers, both of N.Y.; Roy L. Johnston, Charlotte, N.C.; Leonardus A. G. Busscher, Duiven; Johannes A. Juijn, Velp, both of Netherlands

[73] Assignee: Akzo Nobel nv, Arnhem, Netherlands

[21] Appl. No.: 96,756

[22] Filed: Jul. 22, 1993

Related U.S. Application Data

[63] Continuation of Ser. No. 812,606, Dec. 23, 1991, abandoned.

[51] Int. Cl.$^5$ ............................................. C08L 67/02
[52] U.S. Cl. ..................................... 525/444; 525/450
[58] Field of Search ......................................... 525/444

[56] References Cited

U.S. PATENT DOCUMENTS

| | | | |
|---|---|---|---|
| 3,778,410 | 12/1973 | Kuhfuss. | |
| 4,228,218 | 10/1980 | Takayanagi | 525/58 |
| 4,408,022 | 10/1983 | Cincotta et al. | 525/444 |
| 4,728,698 | 3/1988 | Isayev et al. | 525/439 |
| 4,792,587 | 12/1988 | Kanoe | 525/131 |
| 4,837,284 | 6/1989 | Matzner et al. | 525/437 |
| 5,157,103 | 10/1992 | Kantor et al. | 528/272 |
| 5,162,434 | 11/1992 | Pielartzik et al. | 525/66 |

FOREIGN PATENT DOCUMENTS 0390489 10/1990 European Pat. Off.

OTHER PUBLICATIONS

B. Shin "Speculation on Interfacial Adhesion... Spacer Groups" Pol. Eng. & Sci. vol. 30 No. 1 (1990) pp. 13–21.
Thermotropic Liquid Crystal Polymer Blends by F. P. LaMantia (Technomic Publ. 1993) pp. 1–42.
J. Macromol. Sci.-Phys.; B17(4), 591–615 (1980).
B. C. Auman, Polymer 1988, vol. 29, pp. 938–949.
G. Galli et al.; Makromol. Chem. Rapid Commun. 14, 185–193 (1993).
M. Paci et al., "Calorimetric Study of Blends of Poly(-Butylene Terephthalate) and a Liquid Crystalline Polyester", Journal of Polymer Science: Part B: Polymer Physics, vol. 25, 1595–1605 (1987).
"Block Copolymers", Encyclopedia of Polymer Science and Engineering, vol. 2, pp. 324–326 (1985).
D. Dutta, "Polymer Blends Containing Liquid Crystals: A Review", Polymer Eng. & Sci. vol. 30, No. 17 (1990) pp. 1005–1018.
E. Joseph, "Effect of Thermal History... on PET and PHB", Polymer vol. 26 (1985) pp. 689–703.
M. Kimura, "Compatibility of Poly(butylene Terephthalate) with a Liquid Crystalline Copolyester" J. Polymer Sci. vol. 22 (1984) pp. 1697–1698.

Primary Examiner—Patricia A. Short
Attorney, Agent, or Firm—Richard P. Fennelly; Louis A. Morris

[57] ABSTRACT

Blends of a poly(ethylene terephthalate) matrix and a thermotropic liquid crystalline segmented block copolymer comprising rod (e.g., aromatic ester mesogen units containing flexible alkylene spacers) and flexible coil polymer blocks of poly(butylene terephthalate) can be used as molding compositions or in the formation of fibers and films.

8 Claims, No Drawings

BLEND OF POLYETHYLENE TEREPHTHALATE MATRIX AND THERMOTROPIC LIQUID CRYSTAL BLOCK COPOLYMER

This is a continuation of application Ser. No. 07/812,606 filed Dec. 23, 1991, now abandoned.

BACKGROUND OF THE INVENTION

It is known to blend flexible coil polymers with either liquid crystal homopolymers or liquid crystal random copolymers. A recent review of work in this field is "Polymer Blends Containing Liquid Crystals: A Review", by D. Dutta et al., Polymer Engineering and Science, Mid-September 1990, Vol. 30, No. 17, pp. 1005–1018. The Dutta et al. publication (on pages 1008–1011) discusses certain prior work by Joseph et al. and Misra et al., for example, in which poly(ethylene terephthalate), PET, was used as the matrix material and was mixed with a liquid crystalline copolyester based on parahydroxy benzoic acid (PHB) and PET. In such systems, the flexible coil polymer component (PET) in the liquid crystal polymer was the same as the PET matrix. Dutta et al. also report that Kimura et al. blended a poly(butylene terephthalate), PBT, matrix with a PET/PHB liquid crystal copolymer.

European Patent Publication No. 390,489 shows blends of a crystalline polyalkylene arylate base resin, which in Example 4, can be PET with a random copolyester having a polyalkylene arylate segment which exhibits smectic liquid crystallinity and a polyalkylene arylate segment which does not exhibit smectic liquid crystallinity. This liquid crystal copolyester is derived from the copolymerization of dimethyl terephthalate, dimethyl bibenzoate, and 1,4-butanediol. With such random copolymer additives, the blending operation can readily give rise to transesterification between the matrix and flexible coil polymer moieties in the copolymer.

Quite recently, in contrast to the foregoing systems which rely upon blends of a flexible coil polymer matrix with either a liquid crystal homopolymer or random copolymer, it has been found that a blend can be fabricated from a flexible coil polymer matrix and a thermotropic liquid crystal segmented block copolymer containing mesogenic and flexible coil polymer blocks (as described in U.S. Ser. No. 726,600, filed Jul. 8, 1991). The flexible coil blocks were deemed essential in order to lower the melting point of the liquid crystal-containing additive. For those systems, it was taught that the flexible coil blocks in the block copolymer had to be substantially similar to the composition of the flexible coil polymer matrix, i.e., a PBT matrix and a PBT flexible coil polymer matrix. That application indicates that selection of a PET matrix requires selection of a PET flexible coil block segment. In such block copolymer systems it was perceived that there was a critical need to very closely match the matrix polymer with the flexible coil polymer block segment in the liquid crystal additive in order to enhance compatibility of the blend components.

One fairly recent U.S. patent which describes liquid crystal fiber-reinforced polymer composites and the process for making them is U.S. Pat. No. 4,728,698 to A. Isayev.

SUMMARY OF THE INVENTION

The present invention relates to blends of a PET, rather than PBT, matrix and a thermotropic liquid crystal segmented block copolymer containing mesogenic and flexible coil polymer blocks in which the flexible coil block is PBT. Such blends have utility as molding compositions in the formation of shaped articles and as a composition suitable for the production of fibers and films.

DETAILED DESCRIPTION OF THE INVENTION

The matrix component for the blends of the present invention is of poly(ethylene terephthalate).

The liquid crystalline segmented block copolymer which is intended to be added to the selected flexible coil polymer matrix can be envisioned to have the general formula:

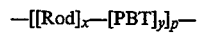

where "Rod" indicates the mesogenic block with x, normally from 2 to 50, indicating the number of mesogen repeats, "PBT" indicating the block comprising the PBT segment, with y, normally from about 2 to about 50, indicating the number of repeat units in the flexible coil polymer block, and p representing the repeat units of Rod and PBT blocks. The mole % rod in the total polymer can range from about 4% to about 80%. The repeat unit p can range from about 1 to about very large numbers such as 50–500 for high molecular weight segmented block copolymers.

The rod length, which is responsible for liquid crystalline properties for the block copolymer additive and the % block in the matrix/block copolymer combination need to be appropriately balanced within the general ranges given above.

The type of mesogenic unit for the rod portion of the LC copolymer can be appropriately selected from known mesogenic units (main chain thermotropic liquid crystal polymers) including those of the general structure:

as set forth in U.S. Pat. No. 4,952,334, for example, which is incorporated herein by reference. In the above formula, for example, in preferred embodiments, X can be $(CH_2)_n$, where n is an integer of from 2 to 10, m can range from about 2 to about 50, and Y and Z can each be —C(O)O— or —C(O)NH— or can be a single bond between two carbon atoms, and A can be p-phenylene, 1,4-, 2,6-, or 1,5-naphthylene, monosubstituted phenylene with methyl, chloro, or phenyl substitution; —ArCH=CHAr—, where Ar is a phenyl ring, —AR—C(O)OAr—, —Ar—C(O)NHAr—, or —ArOC(O)—Ar—C(O)O—Ar—, as more fully depicted in the aforementioned patent. In addition another mesogenic unit which can be employed has the structure —Ar—C(O)—NH—Ar—NH—C(O)—Ar—. The commercial rod polymers based on oxybenzoate units, 4,4'-biphenylene terephthalate units, and oxynaphthalene carboxylate units (the latter two including copolymers with the oxybenzoate units) can be especially preferred.

A particularly preferred structure for the "Rod" or mesogenic unit is of the general type described by Ober et al. in Polymer Journal, Vol. 14, No. 1, pp. 9–17 (1972) and, in view of its presence in a block copolymer as contrasted to the Ober et al. homopolymer, has the structure:

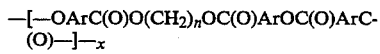

where Ar represents phenyl with para- bond sites, n can range from 2 to 10, e.g., 4 and x can range, for example, from about 2 to about 50. These mesogenic units can be characterized as aromatic ester mesogenic units containing a flexible alkylene spacer. The "triad" structure comprising three linearly-aligned aromatic rings, the bis(p-carboxyphenyl) terephthalate moiety, and a flexible spacer of varying length (n), which can be alkylene or alkylene with heteroatom (e.g., oxygen) interruption, is particularly preferred as depicted above. The mesogenic units contain "diad" or "dyad" linkages, —OC(O)ArOC(O)ArC(O)—, at either end adjacent the connection points with the PBT block segments.

Although the particular thermotropic LCP block (e.g., triad with flexible spacer block and polyester block) of structure (I), above, is not a true rigid-rod, it readily assumes an extended chain structure and forms nematic mesophases and consequently high modulus/strength structures. Ideally, the high strength chain extended block polymer molecules would be very finely dispersed in the PET matrix and would be expected to have potential as a high performance molecular composite material.

The foregoing type of thermotropic liquid crystal block copolymer can be synthesized by the process shown in U.S. Ser. No. 726,600. Preferably it is synthesized by the one reactor process described and claimed in U.S. Ser. No. 779,477, filed on Oct. 18, 1991, entitled "Synthesis of Block Liquid Crystal Copolymer", which is incorporated herein by reference.

In the blends of the present invention, the block copolymer additive can be present at about 0.5% to about 99%, by weight of the matrix, more preferably at about 1% to about 35% by weight of the matrix for fiber and molding applications.

The additive acts as a nucleating agent and affects the crystallization behavior of the PET with the blend showing a higher crystallization temperature and a narrow temperature range where crystallization occurs. This provides evidence for the increased orientation and crystallinity provided by the LCP additive. The blend also exhibits a high melt flow rate (the LCP acts as a flow promoter) and, hence, it can be melt processed at temperatures which are 20°–40° C. lower than required for PET homopolymer. Melt Index values (g/10 min. and W-2,160 kg) that were recorded at 260° C. for molding grade PET (ARNITE DO2-300 from Akzo) blends with 0%, 1%, 10% and 20% LCP, respectively, were 17, 31, 56 and 79, respectively. Scanning electron microscopy (SEM) examination of the molded specimens did not show any phase separation.

Fibers prepared from the blends of fiber grade PET with the LCP described herein showed significantly improved tensile properties as well as shrinkage resistance as compared to PET fibers in certain runs. The PET/LCP blends could be melt spun into fibers at temperatures 20°–40° C. lower than required for the PET homopolymer. The drawing temperature of the as-spun fibers should be adjusted according to the respective Tg values as would be known to persons of ordinary skill in the art. As spun, blend fibers demonstrated improved drawing properties as compared to fibers made from PET alone. The Melt Index (g/10 min. and W=2,160 kg) recorded at 270° C. for the blend containing 10% wt LCP was about five times higher than that obtained for PET alone even at 285° C. SEM analysis of the blend fibers showed a fine morphology without phase separation.

The Examples which follow illustrate certain embodiments of the invention.

EXAMPLE 1

This Example relates to blend compositions formed from a PET matrix and a block copolymer of a triaromatic mesogenic unit with butylene spacers within and PBT blocks. Ober et al. in Polymer J. 14, (1), 9 (1982) shows the structure of the mesogenic or "rod" portion only of the thermotropic liquid crystalline block copolymer (abbreviated "LCP" below).

The blends were made as follows:

A series of mixtures of fiber grade PET (AKZO tire yarn chips) and the LCP were tumble mixed for about three hours under nitrogen to yield a stable preblend by the process described and claimed in U.S. Ser. No. 812,607, filed on even date herewith. A portion of the preblend was then extruded in a CSI mixing extruder in the temperature range of 240° C. to 280° C. depending on blend composition using a residence time of 1–2 minutes (Run Nos. 1–10). The extrudate was then ground to 20 mesh size using a Thomas Wiley mill.

Another portion of the preblend was extruded in a Brabender mixer equipped with a single screw extruder at 230°–270° C. (Run No. 11). The extrudate was then pelletized.

Table 1 illustrates thermal properties such as glass transition temperature (Tg), melt temperature (Tm), and crystallization temperature (Tc), which were measured using a Perkin Elmer DSC-7 differential scanning calorimeter. The blend compositions exhibited a single Tg which indicates that both components are highly compatible (even miscible). The blends also showed a higher crystallization temperature as compared to the unmodified PET. Blends containing less than 35% of the LCP show one crystallization temperature. Above 35% LCP, multiple melting and crystallization behavior was observed for the blends, which indicates the presence of a LCP rich phase.

TABLE 1

| Run No. | PET/LCP (wt/wt) | Extrusion Temp (°C.) | Tg (°C.) | Tm (°C.) | Tc (°C.) |
|---|---|---|---|---|---|
| 1 | 100/0[a] | 275–280 | 81 | 246 | 164 |
| 2 | 98/2 | 275–280 | 81 | 248 | 182 |
| 3 | 95/5 | 256–272 | 78 | 248 | 190 |
| 4 | 90/10 | 260–265 | 78 | 248 | 178 |
| 5 | 80/20 | 260–265 | 72 | 249 | 179 |
| 6 | 50/50 | 250–255 | 60 | 246 | 171 |
| 7 | 20/80 | 245–250 | 42 | 201 | 164 |
|   |   |   |   | 234 | 231 |
| 8 | 10/90 | 242–247 | 39 | 202 | 185 |
|   |   |   |   | 247 | 230 |
| 9 | 5/95 | 235–240 | 36 | 203 | 162 |
|   |   |   |   | 252 | 191 |
|   |   |   |   |   | 228 |
| 10 | 0/100[a] | 235–240 | 36 | 204 | 163 |
|   |   |   |   | 247 | 187 |
|   |   |   |   |   | 228 |
|   |   |   |   |   | 275 |
| 11 | 90/10 | 230–270 | 78 | 249 | 179 |

[a]for comparison, not part of invention.

Melt flow properties of the selected blend compositions are shown in Table 2. The melt indices of the blends are higher than that of the PET, in turn the blends can be melt-processed at lower temp than the unmodified PET.

TABLE 2

| Run No. | PET/LCP (wt/wt) | MFI$^{(a)}$ g/10 min at 270° C. |
|---|---|---|
| 1 | 100/0$^{(b)}$ | 10 |
| 4 | 90/10 | 46 |
| 5 | 80/20 | 149 |

$^{(a)}$melt flow index at weight = 2160 gm.
$^{(b)}$for comparison at 285° C., not part of the invention.

EXAMPLE 2

This illustrates a molding composition containing the type of PET matrix and LCP block copolymer described in Example 1. The molding composition blend was formed by the preblending and then melt blending procedure described in Example 1 with molding grade PET (Arnite DO2-300 brand from Akzo) and LCP block copolymer.

The LCP affected the crystallization behavior of the PET. The PET/LCP blends showed higher crystallization temperature and a narrow temperature range where the crystallization occurs. The blends also exhibited a high melt flow rate and hence can be melt-processed at temperatures 20°–40° C. lower than required for the PET homopolymer. Melt Index values (g/10 min and W=2,160 g) recorded at 260° C. for the PET (Arnite DO2-300) blends containing 0, 1, 10 and 20% LCP were 17, 31, 56 and 79, respectively. SEM analysis of the molded specimens showed a very fine structure.

Table 3, below, shows the thermal properties and melt flow index of the blend composition:

TABLE 3

| Run No. | PET/LCP (wt/wt) | Tm (°C.) | Tc (°C.) | MFI$^{(b)}$ (g/10 min at 260° C.) |
|---|---|---|---|---|
| 1 | 100/0$^{(a)}$ | 243 | 173 | 17 |
| 2 | 99/1 | 243 | 183 | 31 |
| 3 | 95/5 | 242 | 180 | 39 |
| 4 | 90/10 | 243 | 181 | 56 |
| 5 | 80/20 | 243 | 176 | 79 |
| 6 | 50/50 | 236 | 157 | 120 |
|   |       |     | 194 |     |
| 7 | 20/80 | 198 | 148 | 190 |
|   |       | 219 | 183 |     |
|   |       | 236 |     |     |

$^{(a)}$for comparison, not part of the invention.
$^{(b)}$melt flow index at weight = 2160 g.

EXAMPLE 3

This Example illustrates some spinning and drawing work in making fibers from blends of 90% PET and 10% of the LCP block copolymer and of 80% PET and 20% LCP.

Melt spinning was conducted on a RANDCASTLE MICROTRUDER apparatus with a ¼ inch screw extruder and a single spinning hole having a diameter of 0.5 mm and an 1/d of 20. A CSI take-up unit was employed using a range of velocity of 90–100 m/min.

The hot drawing step used two CSI take-up units and a hot plate.

The following spinning and drawing parameters were used:

TABLE 4

| Melt Spinning | PET* | Blends |
|---|---|---|
| I Zone temperature (°C.): | 240 | 240 |
| II Zone Temperature (°C.): | 283 | 266 |
| III Zone temperature (°C.): | 308 | 260 |
| Die Temperature (°C.): | 317 | 266 |
| Take-up velocity (m/min): | 100 | 90 |
| Hot Drawing: | | |
| Temperature (°C.): | 110–115 | 110–115 |
| Feed velocity (m/min): | 7.5 | 10.8 |
| Take-up velocity (m/min): | 34.1 | 32.8 |
| Draw ratio: | 4.5 | 3.0 |

*for comparison, not part of the invention.

The following differential scanning calorimetry (DSC) data were generated for fibers made from a blend of 90% PET and 10% LCP and control PET in accordance with the above procedure.

TABLE 5

| Parameter | PET | Blend |
|---|---|---|
| Glass transition temp (°C.): | — | — |
| Melt transition temp (°C.): | 245 | 242 |
| Crystallization temp (°C.): | 198 | 198 |
| Beginning of crystallization (°C.): | 218 | 212 |
| End of crystallization (°C.): | 172 | 181 |
| Heating and cooling rate - 20 deg/min. | | |

Blend fibers of 90:10 and 80:20 PET:LCP revealed improved tensile properties as shown in Table 6.

TABLE 6

| | Materials (monofilaments) | | |
|---|---|---|---|
| | PET$^{(a)}$ | PET/LCP (90:10) | PET/LCP (80:20) |
| Linear Density, dtex | 8.4 | 7.5 | 8.6 |
| Tenacity, mN/tex | 340 | 399 | 329 |
| Elongation at break, % | 36 | 16.6 | 17.3 |
| Initial modulus, N/tex | 10.7 | 11.5 | 12.2 |

$^{(a)}$For comparison, not part of the invention.

EXAMPLE 4

This Example illustrates that fibers can be spun from the blends at lower temperatures depending on the LCP content in the blends as compared to unmodified PET. In addition, as-spun blend fibers can be drawn at a higher ratio. Monofilaments were spun using the RANDCASTLE MICROTRUDER apparatus described in Example 3:

TABLE 7

| Melt Spinning | PET | PET/LCP (90:10) | | | |
|---|---|---|---|---|---|
| Run No. | 1 | 2 | 3 | 4 | 5 |
| I Zone Temp (°C.): | 260 | 240 | 240 | 240 | 240 |
| II Zone Temp (°C.): | 299 | 276 | 276 | 276 | 278 |
| III Zone Temp (°C.): | 310 | 300 | 300 | 300 | 300 |
| Die Temp (°C.): | 310 | 263 | 253 | 245 | 253 |
| Output (g/min): | 0.65 | 0.75 | 0.78 | 0.8 | 0.7 |
| Drawing: | | | | | |
| Pin Temp (°C.): | 78 | 78 | 78 | 78 | 77 |
| Hot Plate (°C.): | 210 | 210 | 210 | 210 | 220 |
| Feed Velocity (m/min): | 4.6 | 5.5 | 5.2 | 4.6 | 4.7 |
| Take-up Velocity (m/min): | 25.6 | 40.7 | 39 | 31 | 34.4 |
| Total Draw Ratio: | 5.5 | 7.4 | 7.5 | 6.7 | 7.35 |

The properties of drawn fibers are shown in Table 8.

TABLE 8

| Run No. | PET (a) 1 | Blend (90:10) 3 | Blend (90:10) 5 |
|---|---|---|---|
| Diameter (μm): | 35 | 36 | 36 |
| Tenacity (mN/tex): | 502 | 652 | 770 |
| Elong. at break (%): | 34.1 | 8.7 | 7.9 |
| Initial Modulus (N/tex): | 10.1 | 13.8 | 17.1 |

EXAMPLE 5

This illustrates another Example for fiber spinning from the blends and fiber properties (10 filaments yarn).

Spinning was carried out on an 18-mm Fournè extruder. A spinning plate with holes (10) of 450 μm diameter was used. The filter package contained 325 mesh gauzes (44 μm) as the finest filtration medium. Winding took place on a separate Leesona winder. Further spinning conditions for the blend, PET/LCP (90:10), and a control PET are shown in Table 9:

TABLE 9

|  | Blend | PET |
|---|---|---|
| Temperature (°C.) | | |
| Zone 1 (°C.) | 241 | 309 |
| Zone 2 (°C.) | 270 | 297 |
| Zone 3 (°C.) | 275 | 297 |
| Die/spinnerette (°C.): | 273 | 297 |
| Throughput/hole (g/min): | 0.7 | 0.7 |
| Winding speed (m/min): | 65 | 65 |

Drawing of the as-spun blend fibers was performed on a pin (6 cm diameter) and a hot plate (40 cm length, 3 passes). With three godet-idler roller combinations, the draw ratios in the first and second step could be adjusted independently. The conditions are shown in Table 10, below. Quite remarkably, the total draw ratio could be adjusted much higher for the blend yarn than for the PET control.

The properties of drawn yarns are in Table 11, below. The initial modulus was higher for the blend yarn in comparison with that of the PET control. However, the shrinkage was lower.

TABLE 10

| Run No. | 1 | 2 | 3 | 4 | 5 |
|---|---|---|---|---|---|
| Polymer Composition | Blend* | Blend | Blend | Blend | Blend |
| Pin temp. (°C.): | 83 | 83 | 83 | 82 | 82 |
| Hot plate temp. (°C.) | 211 | 211 | 211 | 222 | 222 |
| Feed Velocity (m/min): | 4 | 4 | 4 | 4 | 4 |
| Take-up velocity (m/min): | 22 | 24 | 26 | 26.3 | 27 |
| Draw ratio | | | | | |
| first stage: | 4.38 | 4.60 | 4.60 | 4.50 | 4.50 |
| second stage: | 1.26 | 1.30 | 1.41 | 1.46 | 1.50 |
| Total: | 5.5 | 6.0 | 6.5 | 6.58 | 6.75 |
| Run No. | 6 | 7 | 8 | 9 | |
| Polymer Composition | PET | PET | PET | PET | |
| Pin temp. (°C.): | 73 | 73 | 78 | 83 | |
| Hot plate temp. (°C.) | 211 | 211 | 211 | 211 | |
| Feed Velocity (m/min): | 4 | 4 | 4 | 4 | |
| Take-up velocity (m/min): | 19 | 20 | 22 | 22 | |
| Draw ratio | | | | | |
| first stage: | 3.5 | 3.5 | 4.38 | 4.38 | |
| second stage: | 1.36 | 1.43 | 1.26 | 1.26 | |
| Total: | 4.75 | 5.0 | 5.5 | 5.5 | |

*The blend used in Run Nos. 1–5 was a 90/10 wt ratio of PET/LCP.

TABLE 11

| Run No. | 1 | 2 | 3 | 4 | 5 |
|---|---|---|---|---|---|
| Polymer Composition | Blend* | Blend | Blend | Blend | Blend |
| Draw ratio | 5.5 | 6.0 | 6.5 | 6.58 | 6.75 |
| Linear density (dtex): | 200 | 185 | 172 | 172 | 166 |
| Tenacity (mN/tex): | 492 | 540 | 584 | 610 | 636 |
| Elong. at break (%): | 10.9 | 8.2 | 6.2 | 6.6 | 6.3 |
| Initial modulus (N/tex): | 11.4 | 11.7 | 12.3 | 12.3 | 13.4 |
| Hot-Air shrinkage (%) at 190° C.: | 11.1 | 12.2 | 12.8 | — | 11.4 |
| Run No. | 6 | 7 | 8 | 9 | |
| Polymer Composition | PET | PET | PET | PET | |
| Draw ratio | 4.75 | 5.0 | 5.5 | 5.5 | |
| Linear density (dtex): | 222 | 208 | 195 | 194 | |
| Tenacity (mN/tex): | 480 | 530 | 590 | 619 | |
| Elong. at break (%): | 17.2 | 16.0 | 11.7 | 12.0 | |
| Initial modulus (N/tex): | 9.8 | 10.1 | 10.3 | 10.5 | |
| Hot-Air shrinkage (%) at 190° C.: | — | — | — | 14.6 | |

*The blend used in Run Nos. 1–5 was a 90/10 wt ratio of PET/LCP.

EXAMPLE 6

This illustrates another Example for fiber spinning from the blends and fiber properties (10 filaments yarn).

Spinning was carried out on an 18-mm Fournè & extruder as in Example 5. Further spinning conditions for the blend, PET/LCP (90:10), and a control PET are shown in Table 12:

TABLE 12

|  | Blend | PET |
|---|---|---|
| Temperature (°C.) | | |
| Zone 1 (°C.) | 270 | 295 |
| Zone 2 (°C.) | 270 | 290 |
| Zone 3 (°C.) | 270 | 290 |
| Die/spinnerette (°C.): | 290 | 290 |
| Throughput/hole (g/min): | 0.7 | 0.7 |
| Winding speed (m/min): | 65 | 65 |

Drawing of the as-spun blend fibers was performed on a pin (6 cm diameter) and a hot plate (40 cm length, 3 passes) as in Example 5. The conditions are shown in Table 13, below. Quite remarkably, the total draw ratio could be adjusted much higher for the blend yarn than for the PET control.

The properties of drawn yarns are in Table 14, below. The initial modulus was higher for the blend yarn in comparison with that of the PET control. However, the shrinkage was lower.

TABLE 13

| Run No. | 1 | 2 | 3 | 4 | 5 | 6 | 7 |
|---|---|---|---|---|---|---|---|
| Polymer Composition | Blend* | Blend | Blend | Blend | Blend | Blend | PET |
| Pin temp. (°C.): | 58 | 58 | 66 | 66 | 66 | 77 | 75 |
| Hot plate temp. (°C.) | 230 | 230 | 230 | 230 | 230 | 230 | 230 |
| Draw ratio | | | | | | | |

TABLE 13-continued

| Run No. | 1 | 2 | 3 | 4 | 5 | 6 | 7 |
|---|---|---|---|---|---|---|---|
| first stage: | 4.0 | 4.5 | 3.5 | 4.0 | 4.5 | 5.0 | 4.0 |
| Total: | 6.5 | 6.5 | 7.2 | 7.5 | 6.7 | 6.5 | 5.75 |

*The blend used in Run Nos. 1-5 was a 90/10 wt ratio of PET/LCP.

TABLE 14

| Run No. | 1 | 2 | 3 | 4 | 5 | 6 | 7 |
|---|---|---|---|---|---|---|---|
| Polymer Composition | Blend* | Blend | Blend | Blend | Blend | Blend | PET |
| Draw ratio | 6.5 | 6.5 | 7.2 | 7.5 | 6.7 | 6.5 | 5.75 |
| Linear density (dtex): | 109 | 115 | 113 | 110 | 113 | 113 | 122 |
| Tenacity (mN/tex): | 647 | 640 | 621 | 640 | 620 | 626 | 680 |
| Elong. at break (%): | 6.3 | 6.5 | 7.2 | 7.5 | 6.7 | 6.8 | 10.3 |
| Initial modulus (N/tex): | 14.3 | 16.5 | 15.4 | 16.0 | 15.5 | 15.1 | 10.8 |
| Hot-Air shrinkage (%) at 190° C.: | 9.0 | 9.1 | 9.1 | 9.2 | 9.3 | 9.3 | 9.2 |

*The blend used in Run Nos. 1-5 was a 90/10 wt ratio of PET/LCP.

The foregoing Examples should not be construed in a limiting sense since they are only intended to set forth certain illustrative embodiments of the present invention. The scope of protection sought is set forth in the claims which follow.

We claim:

1. A blend of (1) a flexible coil polymer matrix of poly(ethylene terephthalate) and (2) a thermotropic liquid crystalline segmented block copolymer which comprises rod and flexible coil polymer blocks, the rod blocks being main chain, containing a flexible spacer, and being of the formula $$-[-OArC(O)O(CH_2)_nOC(O)ArOC(O)ArC(O)-]-_x$$

where Ar represents phenyl with para- bond sites, n can range from 2 to 10, and x can range from about 2 to about 50, the flexible coil blocks being of poly(butylene terephthalate).

2. A blend as claimed in claim 1 wherein the amount of block copolymer in the matrix ranges from about 0.5% to about 99% by weight of the matrix.

3. A blend as claimed in claim 1 wherein the amount of block copolymer in the matrix ranges from about 1% to about 35% by weight of the matrix.

4. A blend as claimed in claim 1 where n is 4.

5. Fibers made from the blend of claim 1.

6. Fibers made from the blend of claim 2.

7. Fibers made from the blend of claim 3.

8. Fibers made from the blend of claim 4.

* * * * *